United States Patent Office 3,637,826
Patented Jan. 25, 1972

3,637,826
TETRACYCLINE DERIVATIVE
Gianfranco Intelisano, Sesto San Giovanni, Italy, assignor to Italchemi s.r.l. Istituto Chimico Farmaceutico, Milan, Italy
No Drawing. Filed July 5, 1968, Ser. No. 742,528
Claims priority, application France, July 10, 1967, 113,714
Int. Cl. C07c *103/30*
U.S. Cl. 260—519                          1 Claim

ABSTRACT OF THE DISCLOSURE

New antibiotic tetracycline derivatives of formula

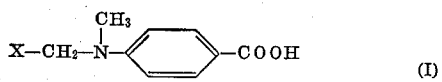

(I)

wherein X represents a tetracycline nucleus, derived from the tetracycline base or from an antibiotic derivative thereof, attached by its amino nitrogen atom.

Said derivatives are prepared by reacting tetracycline base or a derivative thereof with p-methylaminobenzoic acid and formaldehyde.

---

The present invention relates to new tetracycline derivatives having, in particular, an antibiotic activity, to a process for the preparation of said derivatives and to a therapeutical composition containing same.

The new tetracycline derivatives according to the invention have the following general formula:

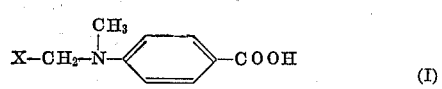

(I)

wherein X represents a tetracycline nucleus, derived from the tetracycline base or from an antibiotic derivative thereof, attached by its amido nitrogen atom.

By tetracycline nucleus is meant a grouping of skeletal structure:

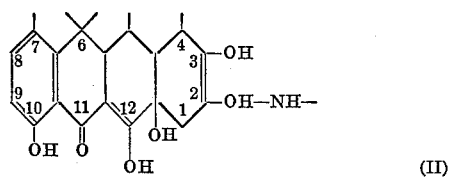

(II)

representing tetracycline base or an antibiotic derivative thereof, such as chlortetracycline, bromotetracycline, oxytetracycline, dedimethylaminotetracycline, dedimethylamino-7-chlorotetracycline, dedimethylamino-5-oxy-tetracycline, 6-desoxytetracycline, 6-desoxy-5-oxytetracycline, 6-demethyltetracycline, 6-demethyl-7-chloro-tetracycline, 6-desoxy-6-demethyl-tetracycline, 6-desoxy-6-demethyl-4-dedimethylaminotetracycline, metacycline, and the like.

The invention includes also the pharmaceutically acceptable salts of said derivatives formed with bases or inorganic or organic acids such as hydrochloric acid, lauric acid, lauryl-sulfuric acid, and the like.

The invention relates also to a process for the preparation of derivatives of Formula I comprising reacting the tetracycline base or a derivative thereof with p-methyl-aminobenzoic acid and formaldehyde.

The reaction is carried out in a suitable organic solvent such as, for example, an aliphatic alcohol such as ethanol, methanol, and the like.

The formaldehyde may be used in the form of an aqueous solution, or as a solution in an organic solvent, or in solid or gaseous form. The resulting product of Formula I may be isolated by precipitation by means of a second solvent, by freeze-drying or by spontaneous precipitation from the reaction solution.

The salts of derivatives of Formula I with bases or acids are prepared by known conventional reactions.

The following non limiting example illustrates the process according to the invention.

EXAMPLE

Preparation of N-[(N'-methyl-p-aminobenzoico)-methyl] tetracycline

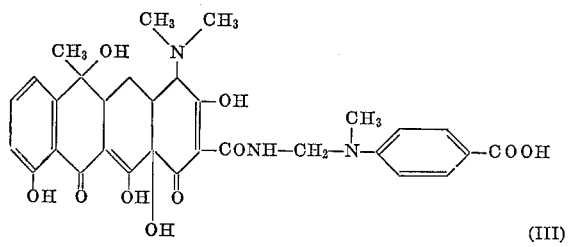

(III)

One gram of tetracycline base is dissolved, with stirring, in 40 ml. of absolute ethanol. To the resulting solution is added, with continued stirring, a solution of 0.364 g. of p-methyl-aminobenzoic acid in 20 ml. of a 2:1 methanol-water mixture.

With continued stirring, 0.252 ml. of a 40% aqueous solution of formaldehyde are then added.

The resulting solution is maintained at a temperature of 35° C. during two hours, and is then placed in a refrigerator at a temperature of —20° C.

After a short period of time, the product precipitates out as a yellow powder which is filtered off. The mother-liquors are placed for a further period of time in the refrigerator at —20° C., and are again filtered.

The product resulting after both filtrations is recrystallized from a small amount of absolute ethanol. It is obtained in the form of a yellow powder which is highly soluble in water and in alcohol, and which dissolves with effervescence in a sodium bicarbonate solution. Its melting point is 180° C. The product gives salts with various bases.

Derivatives of Formula I retain the entire antibiotic activity of the tetracycline nucleus included in their composition. They are substantially better tolerated by the organism than tetracyclin hydrochloride; they are more readily assimilated and give active antibiotic blood levels that are higher and more durable than the corresponding basic tetracycline derivative. In addition, they have particularly marked anti-reactive properties.

These highly useful properties of derivatives of Formula I are illustrated by the results of toxicological, pharmacological and chemiotherapeutical tests set forth below which were carried out with N - [N' - methyl-p-aminobenzoico)-methyl] - tetracycline which is perfectly typical of said derivatives.

(I) Toxicological tests

The $LD_{50}$ of the product administered by the veinous route (as the hydrochloride) is, in mice, of 240 mg./kg. ($LD_{50}$ of tetracycline hydrochloride=165 mg./kg.). In rat, more than 3 g./kg. of the product may be administered orally without any evidence of toxicity. Daily administration of 100 mg./kg. of the product orally, in rat, during sixty consecutive days, has produced no evidence of any alteration of a toxic character in the chief organs or in the most important biological constants.

(II) Minimum inhibiting concentrations

Minimum inhibiting concentrations were determined for different bacterial strains. At a same tetracyclin content, they are substantially equal to those of tetracycline hydrochloride, of pyrrolidinomethyltetracycline and demethylchlortetracycline. The following strains were used: *E. coli* 100, *Salmonella typhi* 199, *Salmonella paratyphi* B, *Staphylococcus aureus, Sarcina lutea, Klebsiella pneumoniae, Pseudomonas aeruginosa, Bacillus subtilis, Bacillus cereus* var. *mycoides* 9634.

(III) Blood levels

In rat and in rabbit, after oral administration, as after endomuscular administration of the product, as early as the first hour, blood concentrations of the active antibiotic superior to those that may be obtained with equal doses of tetracyclin are reached.

These differences are even more substantial after six hours. The amounts of active antibiotic present after eighteen hours may still be determined while they can no longer be determined with tetracycline.

(IV) Anti-reactive properties

The product is endowed with anti-reactive properties that may be evidenced by means of various tests, such as the anaphylactic shock test (administration of 500 mg./kg. of the product, by the oral route, prevents the onset of anaphylactic shock in previously sensitized animals), Sanarelli Schwartzmann's reaction (oral administration of 500 mg./kg. of the product, to rabbits, reduces the severity of the local injury to the point of inhibiting it almost entirely), the test of successful homografting of the skin (rejection of homografts is significantly retarded in rats treated daily, by the intraperitoneal route, with 200 mg./kg. of the product), the test of the granuloma induced by a foreign body (the weight of the reactive granuloma is reduced almost by half in rats treated orally with 500 mg./kg. of the product).

In all such experiments, comparative tests were carried out with equal amounts of tetracycline, and all gave negative results.

The invention relates also to a therapeutical composition comprising, as active ingredient, a derivative of Formula I and a pharmaceutically acceptable vehicle.

The composition according to the invention is administrable orally, parenterally or topically, and is useful in human therapeutics as antibiotic composition in all cases of infection due to tetracycline sensitive germs. The anti-reactive properties make it possible for its chemiotherapeutic action to extend even to the irritation or inflammation component frequently associated with these various infections.

For oral or parenteral administration, the composition is usually formulated in unit dosage form, each unit dose containing 0.10 to 0.50 g. of active ingredient, such as coated tablets, capsules, injectable ampoules, and, for topical administration, it may be formulated in the form of ointments containing 5–15% by weight of active ingredient, the active ingredient being, in all cases, associated with the suitable vehicles or excipients well known in the pharmaceutical art.

Non limiting examples of formulations comprising the composition according to the invention are given below.

(A) Capsules containing each 0.15–0.500 g. of active principles in a suitable excipient.

(B) Injectable ampoules containing each 0.1–0.3 g. of active principle in a liquid for injectable solution.

(C) Ointment containing 10% of active principle in a suitable base.

The dosage administrable per 24 hours vary depending on the case concerned. Averages doses are of 1 capsule every 4–6 hours for oral administration, of an ampoule every 6 hours or once or twice daily for parenteral administration, and 3–4 applications per day for topical use.

Having now described my invention what I claim as new and desire to secure by Letters Patent is:

1. N - [(N' - methyl-p-aminobenzoico)-methyl]tetracycline.

References Cited

UNITED STATES PATENTS 3,042,716    7/1962    Blackwood et al. _____ 260—519

LORRAINE A. WEINBERGER, Primary Examiner

L. A. THAXTON, Assistant Examiner

U.S. Cl. X.R.

260—559 AT, 424—319